June 16, 1953     W. F. WILHELM, JR., ET AL     2,642,155
LUBRICATION APPARATUS
Filed May 14, 1948
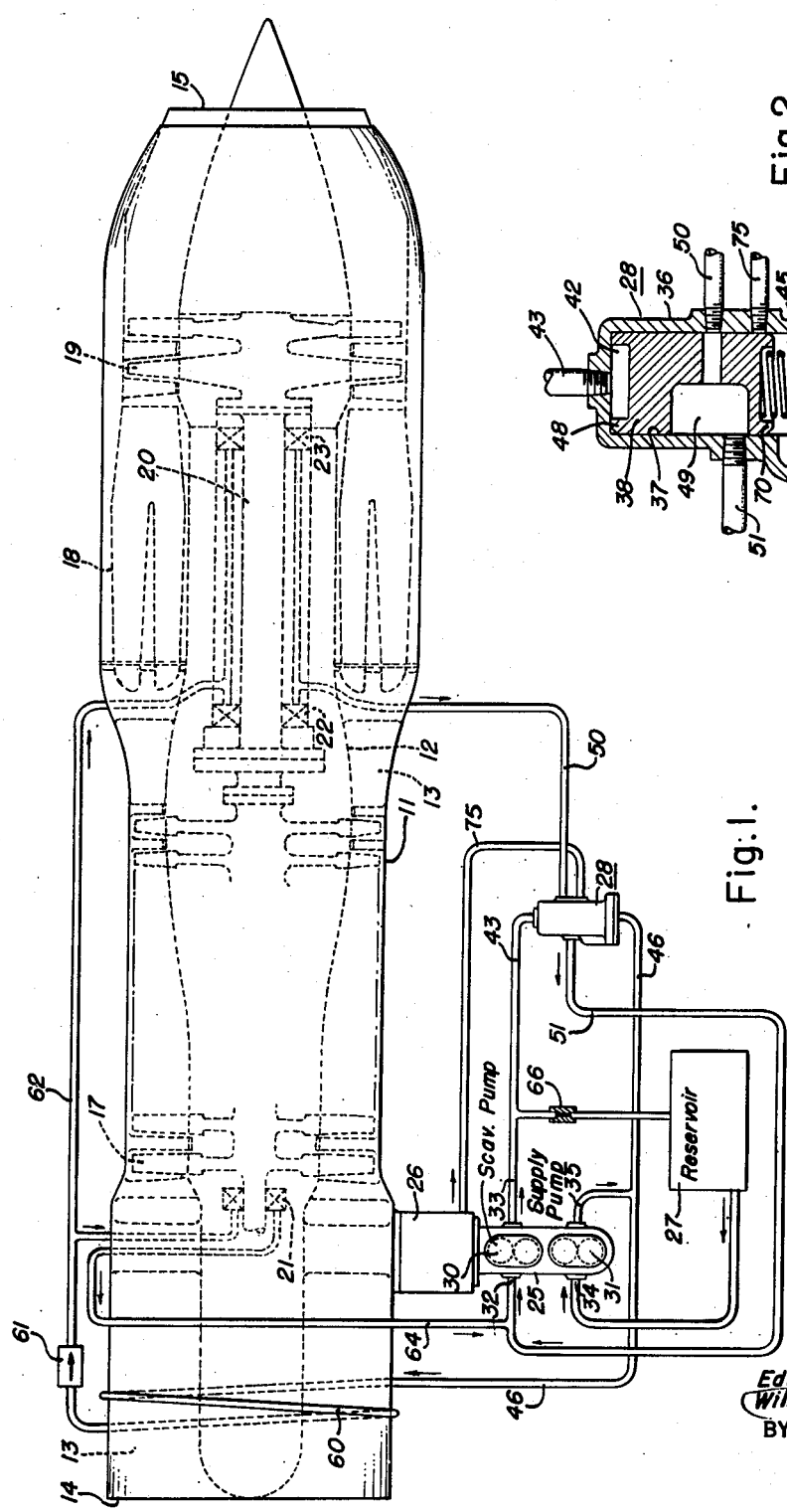
INVENTORS
Edward Gilbert,
Wilbur F. Wilhelm, Jr.
BY
ATTORNEY Patented June 16, 1953

2,642,155

UNITED STATES PATENT OFFICE 2,642,155

LUBRICATION APPARATUS

Wilbur F. Wilhelm, Jr., Prospect Park, Pa., and Edward Gilbert, Washington, D. C., assignors to Westinghouse Electric Corporation, East Pittsburgh, Pa., a corporation of Pennsylvania Application May 14, 1948, Serial No. 27,106

3 Claims. (Cl. 184—6)

This invention relates to lubrication apparatus and more particularly to lubrication apparatus for a gas turbine power plant.

During operation of a gas turbine power plant of the high speed type, such as an aviation gas turbine engine having a turbo-compressor rotor journaled in two or three sets of bearings, it is essential that a substantially constant supply of oil to the bearings be maintained at all times, to insure both lubrication and cooling of the bearings. Such an engine may comprise a rotary compressor, fuel combustion apparatus, and a turbine connected to the compressor through the medium of a common shaft, the rear bearings of which are subjected to the relatively high pressure of gases compressed during operation of the engine. Pressure lubrication of these bearings is usually effected by the provision of a supply pump for delivery of lubricant past a check valves to the bearings, and one or more scavenge pumps having high suction characteristics for withdrawing excess lubricant from the bearings. The supply pump may be of the gear centrifugal type, and usually has full pumping capacity only so long as it is working on oil or lubricant, while the scavenge pump or pumps are preferably oversize and designed for operation to create considerable vacuum. All pump elements are customarily driven by a common shaft mounted in a suitable pump housing carried by the engine.

In the event of interruption of flow of oil through the supply pump, however, due to sudden tilting of the aircraft carrying the engine, for example, the supply pump may become airlocked and unable to reprime itself promptly. Before the pump can become reprimed, it must expel the entrapped air in the discharge pipe against the high back pressure of gases to which the rear bearings are subject, as already explained. Repriming of the supply pump may be further retarded due to leakage within the pump housing of air under pressure from the inlets of the scavenge pump elements into the chamber containing the supply pump element, which will thus tend to remain airlocked.

It is an object of the present invention to provide lubrication apparatus for a gas turbine power plant including means for obviating the difficulty just described.

Another object of the invention is the provision of lubrication apparatus of the type described including means for effecting prompt repriming of the supply pump following interruption in the flow of lubricant therethrough.

A further object of the invention is the provision of means for effecting repriming of a supply pump in response to a reduction in the discharge pressure thereof.

Still another object of the invention is the provision of an auxiliary valve device adapted for association with existing lubrication apparatus of the above type and operative upon a reduction in pressure of lubricant delivered by the supply pump to render the scavenge pump operative to facilitate repriming of the supply pump.

Still a further object is to provide lubrication apparatus including supply and scavenge pumps, and valve means responsive to interruption of flow of lubricant through the supply pump for cutting off communication between the scavenge pump and the rear bearings of the engine, while establishing communication from the outlet of the supply pump to the intake of the scavenge pump for thereby rendering the latter operative to facilitate repriming of the supply pump.

These and other objects are effected by the invention as will be apparent from the following description and claims taken in connection with the accompanying drawings, forming a part of this application, in which:

Fig. 1 is a diagrammatic elevational view of a gas turbine power plant having associated therewith lubrication apparatus constructed in accordance with the invention; and, Fig. 2 is an enlarged detail sectional view of the valve device included in the apparatus shown in Fig. 1.

Referring to Fig. 1, the gas turbine power plant therein disclosed in schematic form comprises an outer casing structure 11 having mounted therein an inner casing structure 12 which, together with the outer casing structure, defines an annular passageway 13 which extends longitudinally through the engine from a forwardly-directed intake opening 14 to a rearwardly-disposed discharge or jet nozzle 15. It will be understood that the casing structure 11 is adapted to be mounted in or on the fuselage or wing of an aircraft (not shown) with the intake opening 14 pointed in the direction of flight. Operating elements of the gas turbine engine include an axial flow compressor 17, annular fuel combustion apparatus 18, and a turbine 19 which is operatively connected to the compressor through the medium of an axially disposed shaft 20. The rotor of the compressor 17 and the shaft 20 are suitably journaled within the inner casing structure 12 on three bearings, which are illustrated diagrammatically in Fig. 1 and are designated by the reference characters 21, 22 and 23. It will be noted that the bearing 23 is disposed in a high pressure zone of the gas turbine engine adjacent the inlet side of the turbine 19.

In accordance with well known principles of gas turbine operation, air entering the intake opening 14 is compressed by the compressor 17 and supplied through the passage 13 to the combustion apparatus 18, where fuel is burned to provide hot motive fluid for driving the turbine 19. Motive fluid exhausted by the turbine is then discharged through the nozzle 15, usually in the form of a jet establishing a propulsive thrust.

The lubrication system diagrammatically represented in Fig. 1 includes a combination supply and scavenge pump device 25, which is mounted on a suitable gear box 26 carried by the casing structure 11, a source of lubricant such as a reservoir 27, and a control valve device 28 which embodies features of the invention. The pump device 25 is illustrated in diagrammatic form as including a scavenge pump 30 and a lubrication or supply pump 31, which are adapted to be operated by means of a common drive shaft connected through the medium of suitable gears (not shown) in the gear box 26 with the shaft of the compressor 17. The pumps 30 and 31 may consist of gear pumping elements or any other suitable rotary pump elements well known in the art. The scavenge pump 30 has an intake 32 and a discharge 33, while the supply pump assembly 31 is provided with an intake 34 and a discharge 35.

Referring to Fig. 2 in the drawing, the control valve device 28 comprises a casing 36 having formed therein a chamber 37 in which is slidably mounted a piston valve element 38. The piston valve element 38 is adapted to be maintained in a normal position, as shown, by the force exerted by a spring 40 which is interposed between the piston element and a cover plate 41 secured to the casing 36. Formed on one side of the piston valve element is a chamber 42, which communicates through a pipe 43 with the scavenge pump discharge portion 33, as shown in Fig. 1. On the opposite side of the piston element 38 there is formed a chamber 45 through which the spring 40 extends, and which communicates by way of a pipe 46 with the discharge portion 35 of the supply pump 31. With the piston valve 38 in the normal position illustrated in Fig. 2, the upper rim 48 thereof engages the end wall of the chamber 42, while a cavity 49 formed in the element establishes communication between a scavenge pipe 50 leading from the rear bearings of the engine, to a pipe 51 which communicates with the intake 32 of the scavenge pump 30 (see Fig. 1).

Assuming that the elements of the valve device 28 are thus positioned in the normal position as described, the normal operation of the lubrication apparatus shown in Fig. 1 is as follows: Lubricant is drawn from the reservoir 27 by operation of the supply pump 31, which discharges lubricant under pressure by way of the pipe 46 through a cooling conduit 60, which is carried by the forward end of the casing structure 11. From the cooling conduit 60 lubricant is passed through a check valve 61 and through a pipe 62 to the bearings 21, 22 and 23. At the same time, the scavenge pump 30 is operative to draw excess lubricant from the bearing 21 by way of a scavenge pipe 64 communicating with the intake 32, and from the rear bearings 22 and 23 by way of the pipe 50, cavity 49 in the piston valve element 48 of the valve device 28, and pipe 51. The lubricant thus scavenged from the bearings is discharged by way of the discharge 33 of the pump to the pipe 43, which communicates by way of a suitable choke 66 with the upper portion of the reservoir 27. The function of the choke 66 is to insure maintenance of scavenged lubricant pressure in chamber 42 of the device 28. It will thus be seen that so long as the supply pump 31 is maintained properly primed with fluid lubricant, a constant supply of lubricant to the bearings of the gas turbine engine is available, while the excess lubricant is extracted therefrom by operation of the scavenge pump, to insure cooling of the bearings.

In the event of accidental interruption of the flow of lubricant through the elements of the supply pump 31, the pocket of air admitted thereto and to the adjacent lubricant pipes renders the pump inoperative to reprime itself, due to the effect of back pressure of gases leaking through the rear bearings of the engine, as hereinbefore explained. According to the invention, upon the resultant reduction in pressure of lubricant in the chamber 45 of the valve device 28, the pressure of lubricant delivered to the chamber 42 by operation of the scavenge pump becomes effective to overcome the force of the spring 40 for shifting the piston valve element 38 downwardly, until a rim 70 thereof engages a stop ring 71 secured in the casing 36. With the piston valve element 38 in this position, communication is established from the pipe 46 through the lower portion of the chamber containing a spring 40 and through a passage 73 to the cavity 49, which still communicates with the pipe 51 leading to the intake 32 of the scavenge pump. At the same time, the cavity 49 also establishes communication between the pipe 51 and a vent pipe 75, which as shown in Fig. 1 leads to the gear box 26, thus relieving the scavenge pump of any excessive supply pump discharge pressure. The scavenge pump 30 is now rendered operative to draw fluid from the discharge 35 of the supply pump 31, through the communications thus set up in the control valve device 28, while the back pressure from the rear bearings 22 and 23 is effectively cut off due to closure of the pipe 50 by the piston valve element 38, and due to prevention of back flow through pipe 62 by the check valve 61.

It will thus be seen that at the time of interruption of the supply of lubricant by the supply pump, the auxiliary valve device 28 becomes effective to isolate the back bearings of the engine, while establishing communication to the intake of the scavenge pump from the gear box and from the supply pump discharge, the gear box being thereby maintained at a high vacuum by operation of the scavenge pump, for facilitating repriming of the supply pump.

Upon repriming of the supply pump 31, the pressure of lubricant delivered to the pipe 46 becomes effective to move the valve piston element 38 to its normal position, as shown in Fig. 2, it being understood that under normal conditions, the supply pump pressure is greater than the discharge pressure of the scavenge pump which acts in chamber 42 on the upper side of the piston valve element. When the piston valve element is thus returned to its normal position, operation of the lubrication apparatus will then be continued as hereinbefore explained. It will be understood that when the engine is shut down, the spring 40 of the control valve device 28 will maintain the piston valve element 38 in its normal position, cutting off communication to pipe 75 to prevent oil from draining from the reservoir by way of the pump elements to the gear box, in case the desired arrangement of elements shown diagrammatically in the drawing should require an elevated mounting of the reservoir relative to the gear box.

While the invention has been shown in but one form, it will be obvious to those skilled in the art that it is not so limited, but is susceptible of various changes and modifications without departing from the spirit thereof.

What is claimed is:

1. A lubricating system for a bearing disposed in a high pressure zone, comprising a low pressure lubricant reservoir, a lubricating pump having an outlet normally connected to said bearing and operative to supply lubricant under pressure from said reservoir to said bearing, a scavenge pump having an inlet normally connected to said bearing and normally operative to draw excess lubricant from said bearing and to return it to said reservoir, and a valve device having communications connected to said lubricating pump outlet, said scavenge pump inlet and said bearing, and operative to effect repriming of said lubricating pump in the event of interruption of oil supply, including a fluid pressure operative valve element subject to the opposing pressures of fluid discharged by said lubricating pump and of fluid flowing from said scavenge pump toward said reservoir, said valve element being disposed in controlling relation with the communication between said bearing and said scavenge pump and being responsive to a reduction in the fluid discharge pressure of said lubricating pump for establishing a by-pass communication therefrom to said scavenge pump inlet for rendering said scavenge pump operable to facilitate priming of said lubricating pump.

2. In a lubricating system including a bearing, a lubricant reservoir, a lubricant supply pump having an inlet connected to said reservoir and an outlet connected to said bearing, said supply pump having a high output pressure characteristic for normally maintaining supply of lubricant under pressure from said reservoir to said bearing, a scavenge pump having an inlet of relatively high suction capacity and an outlet connected to said reservoir, and a communication normally connecting said scavenge pump inlet to said bearing, said scavenge pump being normally operative to return excess lubricant from said bearing to said reservoir, the combination therewith of means for facilitating the priming of said supply pump through the medium of said scavenge pump, comprising a valve casing interposed in said communication and connected to said supply pump outlet, a fluid pressure responsive valve element mounted therein subject to the pressure in said supply pump outlet and normally maintained thereby in a position for holding open said communication through which lubricant is drawn from said bearing to said inlet of the scavenge pump, and a chamber in said casing connected to said scavenge pump outlet for applying scavenge pump pressure to said valve element in a direction for urging said valve element out of said position, said valve element being operable by said scavenge pump pressure upon a reduction in supply pump outlet pressure to a subnormal value for closing said communication while connecting the outlet of said supply pump to said inlet of said scavenge pump, until the normal lubricant pressure in said supply pump outlet is restored.

3. In a lubricating system including a bearing, a lubricant reservoir, a lubricant supply pump having an inlet connected to said reservoir and an outlet connected to said bearing, said supply pump having a high output pressure characteristic for normally maintaining supply of lubricant under pressure from said reservoir to said bearing, a scavenge pump having an inlet of relatively high suction capacity and an outlet connected to said reservoir, and a communication normally connecting said scavenge pump inlet to said bearing, said scavenge pump being normally operative to return excess lubricant from said bearing to said reservoir, the combination therewith of means for facilitating the priming of said supply pump through the medium of said scavenge pump, comprising a valve casing interposed in said communication and connected to said supply pump and scavenge pump outlets, and a fluid pressure actuated valve element disposed in said casing subject to the opposing pressures of lubricant in said supply pump and scavenge pump outlets, and a spring acting on said valve element, said valve element being normally positioned by the supply pump outlet pressure and the force of said spring for holding open said communication through which lubricant flows from said bearing to said scavenge pump inlet, said valve element being operative by scavenge pump pressure upon a predetermined reduction in the pressure of lubricant in said supply pump outlet for connecting the outlet of said supply pump to said inlet of the scavenge pump until said pressure in the supply pump outlet is increased.

WILBUR F. WILHELM, Jr.
EDWARD GILBERT.

References Cited in the file of this patent

UNITED STATES PATENTS

| Number | Name | Date |
| --- | --- | --- |
| 2,249,165 | Owner | July 15, 1941 |
| 2,402,467 | Thompson | June 18, 1946 |